(12) United States Patent
Yan et al.

(10) Patent No.: US 12,442,798 B2
(45) Date of Patent: Oct. 14, 2025

(54) SYSTEM AND METHOD FOR TESTING OF MONOCRYSTALLINE COMPONENTS

(71) Applicant: ROLLS-ROYCE plc, London (GB)

(72) Inventors: Dawei Yan, Derby (GB); Victoriya Ageeva, Derby (GB)

(73) Assignee: Rolls-Royce plc, London (GB)

( * ) Notice: Subject to any disclaimer, the term of this patent is extended or adjusted under 35 U.S.C. 154(b) by 523 days.

(21) Appl. No.: 17/822,466

(22) Filed: Aug. 26, 2022

(65) Prior Publication Data

US 2023/0079690 A1    Mar. 16, 2023

(30) Foreign Application Priority Data

Sep. 13, 2021 (GB) ..................................... 2112995

(51) Int. Cl.
*G01N 29/24* (2006.01)
*G01N 29/06* (2006.01)
*G01N 29/07* (2006.01)

(52) U.S. Cl.
CPC ....... *G01N 29/2468* (2013.01); *G01N 29/069* (2013.01); *G01N 29/07* (2013.01); *G01N 2291/0289* (2013.01)

(58) Field of Classification Search
CPC .. G01N 29/2468; G01N 29/069; G01N 29/07; G01N 2291/0289; G01N 2291/106;
(Continued)

(56) References Cited

U.S. PATENT DOCUMENTS

2007/0157733 A1* 7/2007 Litzenberg ........... G01N 29/043
73/620
2010/0239068 A1* 9/2010 Belassel ................ G01N 23/20
250/306
(Continued)

FOREIGN PATENT DOCUMENTS

DE     102018202725 A1 *  8/2019 ........... F04D 29/668

OTHER PUBLICATIONS

J. Ritter, "Universal Phased Array UT Probe for Nondestructive Examinations using Composite Crystal Technology," NDTnet— Dec. 1996, vol. 1 No. 12, downloaded from https://www.ndt.net/ article/ritter/ritter.htm#:~:text=The%20phased%20array%20probe% 20combines,can%20be%20set%20digitally%20(Fig. (Year: 1996).*

(Continued)

*Primary Examiner* — Michael J Dalbo
*Assistant Examiner* — Denise R Karavias
(74) *Attorney, Agent, or Firm* — Shumaker & Sieffert, P.A.

(57) ABSTRACT

A method for testing of a population of monocrystalline components is provided. The method includes obtaining a plurality of component parameters including a crystal angle of each monocrystalline component with respect to a coordinate axis, a three-dimensional geometry, and a material. The method further includes determining a statistical parameter of the crystal angle, and generating a simulation model of the monocrystalline component based on the statistical parameter, the three-dimensional geometry, and the material. The method further includes determining at least one probe parameter based on the simulation model and a predetermined region of interest. The method further includes determining anisotropic delay laws based on the statistical parameter and the probe parameter, and controlling at least one probe based on the anisotropic delay laws to emit ultrasonic (Continued)

waves towards the region of interest in order to test the monocrystalline component for one or more abnormalities.

17 Claims, 8 Drawing Sheets

(58) Field of Classification Search
CPC . G01N 29/262; G01N 29/4472; G01N 29/043
See application file for complete search history.

(56) References Cited

U.S. PATENT DOCUMENTS

| | | | |
|---|---|---|---|
| 2014/0000369 A1* | 1/2014 | Lane | G01N 29/343 73/598 |
| 2022/0042951 A1* | 2/2022 | Iakovleva | G01S 15/8993 |

OTHER PUBLICATIONS

Nageswaran et al."Microstructural quantification modelling and array ultrasonics to improve the inspection of austenitic welds" https://www.twi-global.com/technical-knowledge/published-papers/microstructural-quantification-modeling-and-array-ultrasonics-to-improve-the-inspection-of-austenitic-welds (Year: 2009).*

European Search Report dated Nov. 17, 2022, issued in EP Patent Application No. EP22190380.0.
Long, et al., "Through-Weld Ultrasonic Phased Array Inspection Using Full Matrix Capture", AIP Conference Proceedings, vol. 29, Jan. 1, 2010, pp. 918-925, DOI: 10.1063/1.3362524.
Great Britain search report dated May 4, 2022, issued in GB Patent Application No. 2112995.2.
Connolly, et al., "Correction of Ultrasonic Array Images to Improve Reflector Sizing and Location in Homogeneous Materials Using a Ray-Tracing Model", The Journal of the Acoustical Society of America, vol. 127, No. 5, May 1, 2010, pp. 2802-2812, DOI: 10.1121/1.3372724.
Nageswaran, et al., "Microstructural Quantification, Modeling and Array Ultrasonics to Improve the Inspection of Austenitic Welds", Insight—Non-Destructive Testing and Condition Monitoring, vol. 51, No. 12, Dec. 31, 2009, pp. 660-666, DOI: 10.1784/insi.2009.51.12.660.
Decision to Grant from counterpart European Application No. 22190380.0 dated Aug. 31, 2023, 15 pp.
Notice of Intent to Grant and Text Intended to Grant from counterpart European Application No. 22190380.0 dated Aug. 3, 2023, 79 pp.

* cited by examiner

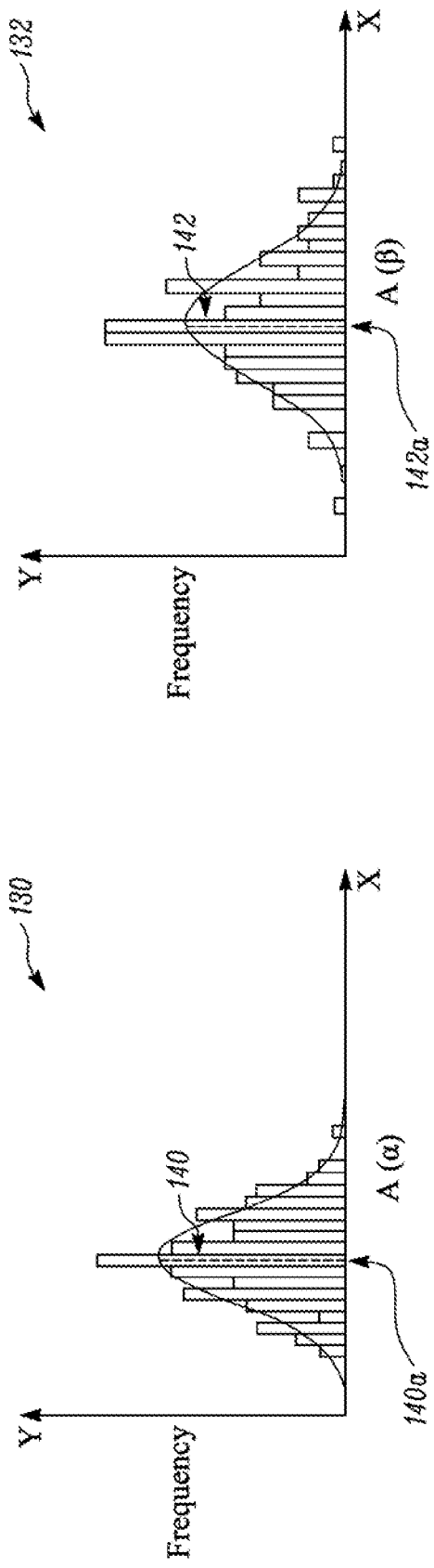
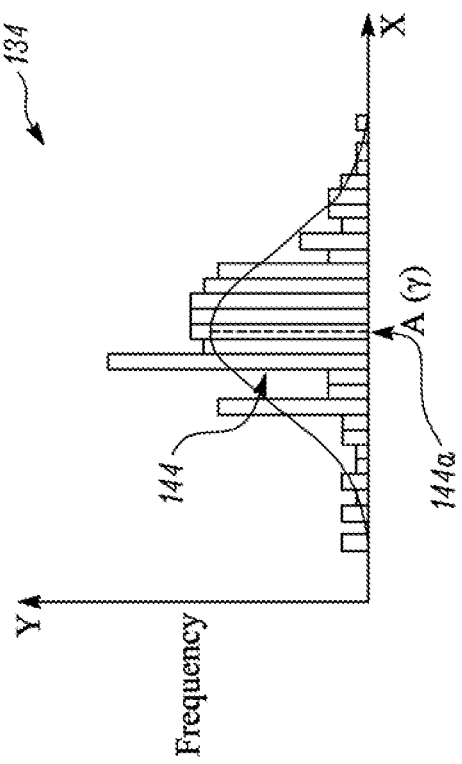

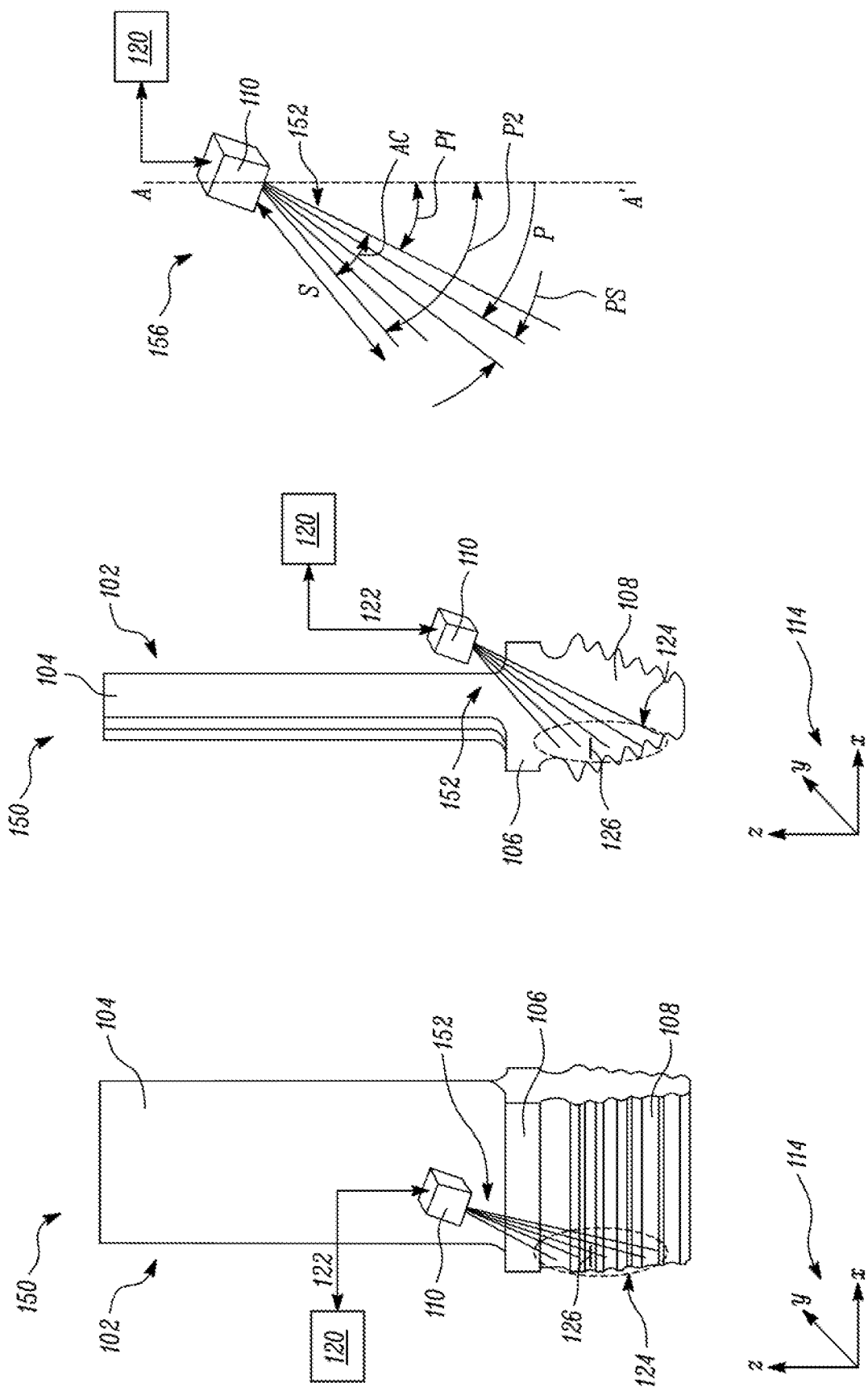

SYSTEM AND METHOD FOR TESTING OF MONOCRYSTALLINE COMPONENTS

CROSS-REFERENCE TO RELATED APPLICATIONS

This specification is based upon and claims the benefit of priority from United Kingdom patent application number GB 2112995.2 filed on Sep. 13, 2021, the entire contents of which is incorporated herein by reference.

BACKGROUND

Technical Field

The present disclosure relates to a system and a method for testing of monocrystalline components.

Description of the Related Prior Art

Non-destructive evaluation (NDE) methods such as ultrasonic testing procedures are commonly used to examine components (e.g., gas turbine engine components) for detecting and characterizing flaws in the components without damaging the components themselves. Typically, ultrasonic testing may involve transmission of ultrasonic waves through a portion of interest associated with the component. The ultrasonic waves may then be reflected back by deformities or discontinuities present in the portion of interest of the component. Measurement and evaluation of the reflected ultrasonic waves may permit determination of the presence and the characteristics of the flaws.

Inspection of monocrystalline components (e.g., gas turbine blades) using ultrasonic testing procedures may be problematic due to anisotropic material properties, as a result of which a path of propagation of the ultrasonic waves varies with a direction of propagation. This may distort propagation of the ultrasonic wave transmitted through the monocrystalline component and complicate signal interpretation based on reflected ultrasonic waves. Thus, a flaw actually present in the component may not be reliably detected. Additionally, propagation of ultrasonic waves may also depend on a crystallographic orientation of the monocrystalline component. Therefore, each monocrystalline component having individual crystallographic orientation is different in terms of inspection.

Conventional ultrasonic testing systems typically involve post-processing of ultrasonic images of the monocrystalline component obtained from the ultrasonic testing procedures to compensate for anisotropic material properties. The post-processing is based on complex velocity models obtained from investigation of wave propagation in anisotropic materials. Such post-processing techniques are time consuming and do not allow direct result interpretation since the ultrasonic images may need to be corrected before interpretation. Additionally, individual crystal orientation must be known or measured accurately for post-processing. Further, imaging algorithms may need to be corrected for each individual crystal orientation of the monocrystalline components.

SUMMARY

According to a first aspect there is provided a method for testing of a population of monocrystalline components. The method includes obtaining a plurality of component parameters associated with the population of monocrystalline components. The plurality of component parameters includes a crystal orientation of each monocrystalline component from the population of monocrystalline components with respect to a coordinate axis common to the population of monocrystalline components, a three-dimensional geometry common to the population of monocrystalline components, and a material common to the population of monocrystalline components. The crystal orientation includes a crystal angle relative to the coordinate axis. The method further includes determining a statistical parameter associated with the population of monocrystalline components based on a statistical distribution of the crystal angle across the population of monocrystalline components. The method further includes generating a simulation model of the monocrystalline component representative of the population of monocrystalline components based at least partially on the statistical parameter, the three-dimensional geometry, and the material. The method further includes determining at least one probe parameter of an inspection probe arrangement based at least partially on the simulation model and a predetermined region of interest in the three-dimensional geometry. The inspection probe arrangement includes at least one probe configured to emit ultrasonic waves. The method further includes determining anisotropic delay laws based at least partially on the statistical parameter and the least one probe parameter. The method further includes controlling the at least one probe based on the anisotropic delay laws to emit the ultrasonic waves towards the region of interest of at least one monocrystalline component from the population of monocrystalline components in order to test the at least one monocrystalline component for one or more abnormalities.

The method of the present disclosure provides a process for development and realisation of the inspection probe arrangement for testing of the monocrystalline components. The method involves prior determination of the component parameters associated with the population of monocrystalline components before testing of the monocrystalline components. The component parameters includes the crystal orientation of each monocrystalline component, the three-dimensional geometry of the monocrystalline component, and the material of the monocrystalline component. Thus, the method considers variation in the crystal orientation of the monocrystalline components across the population of monocrystalline components during development and realisation of the inspection probe arrangement itself.

The method further includes determination of probe parameters based on the simulation model representing the population of the monocrystalline components. The simulation model is generated based on the material of the monocrystalline components, thus accounting for anisotropic material properties of the monocrystalline components for determining actual path of the ultrasonic waves in the monocrystalline component. Further, the probe parameters may be determined based on the simulation model and considering the entire population of monocrystalline components.

The method further includes determination of the anisotropic delay laws based at least partially on the statistical parameter and the least one probe parameter. Once the probe parameters are determined, the anisotropic delay laws may be determined for accurate targeting of the ultrasonic wave towards the region of interest. The anisotropic delay laws may consider anisotropic material properties of the monocrystalline component for determining delay laws of the inspection probe arrangement. Determination of the anisotropic delay laws may overcome complex geometrical challenges by allowing emission of ultrasonic waves towards the region of interest in the three-dimensional geometry of the monocrystalline components.

The method enables real time testing of the monocrystalline components and interpretation of results eliminating the need for any post-processing since the method considers anisotropic material properties of monocrystalline components as well as variation in the crystal orientation across the population of monocrystalline components at the development stage of the inspection probe arrangement and before testing the monocrystalline components. Therefore, the inspection probe arrangement developed based on the present method may provide coverage of the population of monocrystalline components for testing using predetermined probe parameters and anisotropic delay laws. Consequently, post processing of images obtained during testing is not required.

Additionally, elimination of post processing may allow immediate isolation of components with one or more abnormalities. Further, the inspection probe arrangement may be compatible with the existing ultrasonic signal acquisition and interpretation systems. Use of anisotropic material properties for determination of the probe parameters and the anisotropic delay laws may significantly improve a signal to noise ratio of the inspection probe arrangement and ultrasonic images of the monocrystalline components are obtained more accurately and precisely.

In some embodiments, the statistical parameter includes a value of the at least one crystal angle that appears a maximum number of times in the population of monocrystalline components. Thus, the statistical parameter may be representative of the maximum number of monocrystalline components in the population of monocrystalline components. The simulation model may be generated based on the statistical parameter such that the simulation model may represent monocrystalline components having a crystal angle that appears a maximum number of times in the population of monocrystalline components.

In some embodiments, the method further includes determining a range of the at least one crystal angle for which the ultrasonic waves emitted by the at least one probe in response to the anisotropic delay laws at least partially overlap the region of interest. In some embodiments, the method further includes determining a subset of the monocrystalline components from the population of monocrystalline components having values of the at least one crystal angle that fall within the range of the at least one crystal angle. The range of the at least one crystal angle may represent the values of the crystal angles for which the inspection probe arrangement may be able to test the subset of the monocrystalline components based on the anisotropic delay laws.

In some embodiments, the method further includes determining a set of custom anisotropic delay laws such that the ultrasonic waves emitted by the at least one probe in response to the set of custom anisotropic delay laws at least partially overlap the region of interest for an outlier set of values of the at least one crystal angle that lies outside the range of the at least one crystal angle. The set of custom anisotropic delay laws may allow the inspection probe arrangement to test the monocrystalline components for which the at least one crystal angle may lie outside the range of the at least one crystal angle.

In some embodiments, the method further includes controlling the at least one probe based on the anisotropic delay laws and the custom anisotropic delay laws in order to test the population of the monocrystalline components. Thus, the inspection probe arrangement may be universal and may be used to test any monocrystalline component from the population of monocrystalline components based on the anisotropic delay laws and the set of custom anisotropic delay laws.

In some embodiments, the method further includes determining a crystal orientation of the at least one monocrystalline component. In some embodiments, the method further includes selecting the anisotropic delay laws or one of the set of custom anisotropic delay laws based on the crystal orientation. In some embodiments, the method further includes controlling the at least one probe based on the selected anisotropic delay laws or the one of the set of custom anisotropic delay laws in order to test the at least one monocrystalline component. Thus, the inspection probe arrangement may allow selection of the anisotropic delay laws or one of the set of custom anisotropic delay laws as applicable based on the crystal orientation of the at least one monocrystalline component in order to test the at least one monocrystalline component.

In some embodiments, the method further includes sequentially controlling the at least one probe based at least on the anisotropic delay laws and the set of custom anisotropic delays laws to test the at least one monocrystalline component if a crystal orientation of the at least one monocrystalline component is unknown. Thus, the inspection probe arrangement may allow testing of the monocrystalline components even if the crystal orientation of the at least one monocrystalline component is unknown during testing. Further, the method may eliminate measurement of the at least one crystal angle of the monocrystalline component during testing.

In some embodiments, the at least one probe is at least one phased array probe.

According to a second aspect, there is provided a system for testing a population of monocrystalline components. The system includes at least one probe configured to emit ultrasonic waves towards a region of interest. The system further includes a processor communicably coupled to the at least probe and configured to obtain a plurality of component parameters associated with the population of monocrystalline components. The plurality of component parameters includes at least one of a crystal orientation of each monocrystalline component from the population of monocrystalline components with respect to a coordinate axis common to the population of monocrystalline components, a three-dimensional geometry common to the population of monocrystalline components, and a material common to the population of monocrystalline components. The crystal orientation includes at least one crystal angle relative to the coordinate axis. The processor is further configured to determine a statistical parameter associated with the population of monocrystalline components based on a statistical distribution of the at least one crystal angle across the population of monocrystalline components. The processor is further configured to generate a simulation model of the monocrystalline component representative of the population of monocrystalline components based at least partially on the statistical parameter, the three-dimensional geometry, and the material. The processor is further configured to determine at least one probe parameter of an inspection probe arrangement based at least partially on the simulation model and a predetermined region of interest in the three-dimensional geometry. The inspection probe arrangement includes at least one probe configured to emit ultrasonic waves. The processor is further configured to determine anisotropic delay laws based at least partially on the statistical parameter and the least one probe parameter. The processor is further configured to control the at least one probe based on the anisotropic delay laws to emit the ultrasonic waves towards the region of interest of at least one monocrystalline component from the population of monocrystalline components in order to test the at least one monocrystalline component for one or more abnormalities In some embodiments, the statistical parameter includes a value of the at least one crystal angle that appears a maximum number of times in the population of monocrystalline components.

In some embodiments, the processor is further configured to determine a range of the at least one crystal angle for which the ultrasonic waves emitted by the at least one probe in response to the anisotropic delay laws at least partially overlap the region of interest. In some embodiments, the processor is further configured to determine a subset of the monocrystalline components from the population of monocrystalline components having values of the at least one crystal angle that fall within the range of the at least one crystal angle.

In some embodiments, the processor is further configured to determine a set of custom anisotropic delay laws such that the ultrasonic waves emitted by the at least one probe in response to the set of custom anisotropic delay laws at least partially overlap the region of interest for an outlier set of values of the at least one crystal angle that lies outside the range of the at least one crystal angle.

In some embodiments, the processor is further configured to control the at least one probe based on the anisotropic delay laws and the set of custom anisotropic delay laws in order to test the population of the monocrystalline components.

In some embodiments, the processor is further configured to determine a crystal orientation of the at least one monocrystalline component. In some embodiments, the processor is further configured to select the anisotropic delay laws or one of the set of custom anisotropic delay laws based on the crystal orientation. In some embodiments, the processor is further configured to control the at least one probe based on the selected anisotropic delay laws or the one of the set of custom anisotropic delay laws in order to test the at least one monocrystalline component.

In some embodiments, the processor is further configured to sequentially control the at least one probe based at least on the anisotropic delay laws and the set of custom anisotropic delays laws in order to test the at least one monocrystalline component if a crystal orientation of the at least one monocrystalline component is unknown. Thus, the processor may control the at least one probe until all predefined delay laws (anisotropic delay laws and the set of custom anisotropic delays laws) are used in order to test the at least one monocrystalline component if the crystal orientation of the at least one monocrystalline component is unknown. This may ensure testing of all the monocrystalline components in the population of monocrystalline components including the monocrystalline components for which the at least one crystal angle is from the outlier set of values of the at least one crystal angle.

In some embodiments, the at least one probe includes a plurality of probes.

In some embodiments, the at least one probe is at least one phased array probe.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIGS. 3A-3C illustrate examples of statistical distributions of at least one crystal angle;

FIGS. 4A and 4B are schematic front and side views, respectively, of a simulation model of the monocrystalline component, according to an embodiment of the present disclosure;

FIG. 4C illustrates anisotropic delay laws, according to an embodiment of the present disclosure;

DETAILED DESCRIPTION

Figure 1:
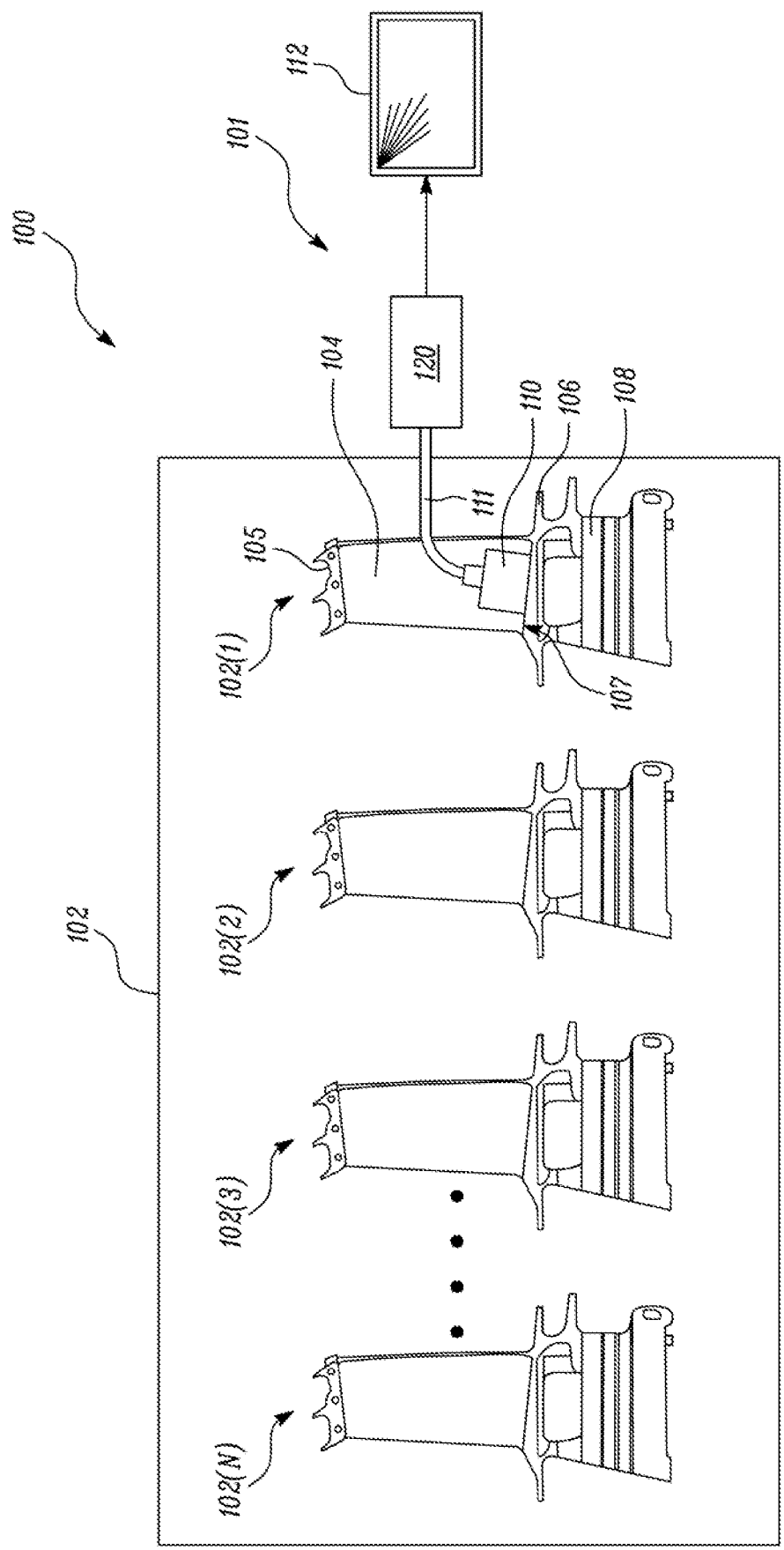
FIG. 1 is a schematic view of an exemplary system for testing a population of monocrystalline components.

Aspects and embodiments of the present disclosure will now be discussed with reference to the accompanying figures. Further aspects and embodiments will be apparent to those skilled in the art.

As used herein, the term "crystal" generally refers to a three-dimensional ordered arrangement of atoms or molecules, which possesses symmetry characteristics.

As used herein, the term "crystal orientation" generally refers to an orientation state of the crystal in a structure of the material.

As used herein, the term "monocrystalline" generally refers to materials that are a single crystal or that are substantially a single crystal. In other words, the term "monocrystalline" generally refers to a single crystal material or one that includes a few (typically, 10 or fewer) large crystals that are oriented in the same crystallographic direction, i.e., having crystallographic planes with miller indices that are aligned to one another. Thus, the crystals in the monocrystalline materials may generally have same crystal orientation.

As used herein, the term "anisotropic" generally means having at least one property that differs in value when measured in at least one different direction. Thus, the term "anisotropic material" generally refers to a material having at least one property that differs in value when measured in at least one different direction.

The term "sound wave" generally refers to acoustic waves or pressure waves or vibrations traveling through gas, liquid or solid. Sound waves include ultrasonic, audio and infrasonic waves.

As used herein, the terms "ultrasound" or "ultrasonic wave" generally refer to the sound waves having a frequency above the upper limit of audible spectrum of the human ear, usually about 20,000 hertz. The terms "ultrasonic" and "ultrasound" are used interchangeably herein.

As used herein, the term "probe", whether applied to an ultrasound probe, a photoacoustic probe, an excitation probe or otherwise, generally refers to an element that serves a signal generating function or a signal reception function or both. Thus, an "ultrasonic probe" or "ultrasound probe" or "ultrasound echo probe" generally refers to an element capable of sending ultrasonic waves and/or receiving such waves. The term "probe" also encompasses accessory elements necessary for the probe to function in the several embodiments of the disclosure.

As used herein, the term "velocity profile" generally refers to velocity of a sound wave as a function of time and/or distance and/or direction in a material. As used herein, the term "three-dimensional (3D) velocity profile" generally refers to velocity of a sound wave as a function of time and/or distance in a three-dimensional geometry of the material. It is generally known in the art that the velocity of a sound wave in a material depends on the mechanical properties of the material. Thus, the "3D velocity profile" may be a characteristic of the material and may be used for characterizing propagation of a sound wave inside the material.

FIG. 1 illustrates a schematic view of a system 100 for testing a population of monocrystalline components 102 according to an embodiment of the present disclosure. In some embodiments, the population of monocrystalline components 102 may include a number of monocrystalline components 102(1), 102(2), 102(3), . . . , 102(N) (collectively, monocrystalline components 102), where N is an integer corresponding to a total number of monocrystalline components 102 (e.g., N=10, 20, etc.) in the population of monocrystalline components 102. In the illustrated embodiment of FIG. 1, the monocrystalline component 102 is a blade of a gas turbine engine (not shown), however, the monocrystalline component 102 may include any solid part or a combination of parts.

In some embodiments, each monocrystalline component 102 includes an aerofoil 104, a root section 108, and a platform 106 positioned adjacent to the root section 108. In some embodiments, the platform 106 is coupled to the root section 108 for mounting the aerofoil 104. The aerofoil 104 may extend longitudinally and/or radially outward in span from the platform 106 to an aerofoil tip 105. The platform 106 may extend generally transversely from a bottom 107 of the aerofoil 104. In some embodiments, the root section 108 may be used for mounting the monocrystalline component 102 on a rotor (not shown) of the gas turbine engine. In some embodiments, the root section 108 may transfer a torque to the rotor upon receiving a gas impingement on the aerofoil 104. In some embodiments, the monocrystalline component 102 may include cooling channels (not shown) running between the root section 108 and the aerofoil 104.

It should be noted that the monocrystalline component 102 as illustrated in FIG. 1 is exemplary only and a configuration of the monocrystalline component 102 may take any conventional form, with or without the platform 106 or the root section 108. For example, the monocrystalline component 102 may be formed integrally with a disk in a blisk-type configuration that does not include the root section 108.

In some embodiments, the monocrystalline component 102 may include an anisotropic metallic material. In some embodiments the monocrystalline component 102 may be produced using directional solidification casting techniques. Directional solidification may allow longitudinal grains of the monocrystalline component 102 to be aligned in a predetermined direction (crystallographic orientation), for example, along a direction of the aerofoil 104. In some embodiments, the crystallographic orientation of the monocrystalline component 102 may vary across the population of monocrystalline components 102. The crystallographic orientation is interchangeably referred to hereinafter as "the crystal orientation".

During operation, centrifugal forces may force the monocrystalline component 102 outward and induce loading forces into the root section 108. Over time, such forces may induce abnormalities or defects (e.g., cracks) within the root section 108 due to fatigue at locations that may be radially inward from the platform 106. Accordingly, the monocrystalline component 102 may need to be inspected by an inspection probe arrangement 101 of the system 100 to ensure that the monocrystalline component 102 does not include any defects.

In some embodiments, the abnormalities may occur in the root section 108 of the monocrystalline component 102 where the centrifugal loading is greatest, and a complex geometry of the cooling channels may cause high stress concentrations. The abnormalities may therefore most likely occur in a specific region of the monocrystalline component 102. Such abnormalities may be detected though the inspection probe arrangement 101. For example, the inspection probe arrangement 101 may inspect a crack-susceptible region of the monocrystalline component 102.

The system 100 or the inspection probe arrangement 101 includes at least one probe 110 configured to detect the one or more abnormalities occurring in the monocrystalline component 102. The at least one probe 110 is interchangeably referred to hereinafter as "the probe 110". The probe 110 may be placed in a position contacting the monocrystalline component 102 radially outward from the platform 106 to inspect the root section 108. In some embodiments, the probe 110 may utilize ultrasonic waves for detection of the one or more abnormalities. In some embodiments, the probe 110 may allow inspection of the monocrystalline component 102 in an installed state within the gas turbine engine.

In some embodiments, the ultrasonic waves may be emitted precisely into a region of the root section 108 in which the one or more abnormalities are expected and which, therefore, needs to be inspected. Such a region may be referred to as a region of interest. Thus, the probe 110 is configured to emit the ultrasonic waves towards the predetermined region of interest.

In some embodiments, the probe 110 may include one or more ultrasonic elements that emit the ultrasonic waves which propagate into the monocrystalline component 102, for example, towards the region of interest. In some embodiments, the probe 110 may include an array of the ultrasonic elements. In some embodiments, the ultrasonic waves may be moved in space to scan the region of interest by sequentially activating each ultrasonic element through an inspection program.

In some embodiments, the ultrasonic waves may get reflected when the waves encounter an outer surface of the monocrystalline component 102. The probe 110 may convert the reflected ultrasonic waves into electrical signals which may then be used to generate internal images of the monocrystalline component 102 for further analysis. Any abnormality in the monocrystalline component 102 may also reflect or scatter the incident ultrasonic waves. Thus, the reflected ultrasonic waves may be detected by the probe 110 or a separate probe to infer presence of any abnormality.

The system 100 or the inspection probe arrangement 101 further includes a processor 120 communicably coupled to the at least probe 110 via a cable 111. In some embodiments, the probe 110 is configured to obtain a three-dimensional (3D) ultrasound image of the region of interest responsive to instructions from the processor 120, e.g., at appropriate times before or during an inspection process.

In some embodiments, the processor 120 may be embodied in a number of different ways. For example, the processor 120 may be embodied as various processing means, such as one or more of a microprocessor or other processing elements, a coprocessor, or various other computing or processing devices including integrated circuits such as, for example, an ASIC (application specific integrated circuit), an FPGA (field programmable gate array), or the like. In some embodiments, the processor 120 may be configured to execute instructions stored in a memory provided with the processor 120 or otherwise accessible to the processor 120. In some embodiments, the memory may include a cache or random-access memory for the processor 120. Alternatively, or in addition, the memory may be separate from the processor 120, such as a cache memory of a processor, a system memory, or other memory.

As such, whether configured by hardware or by a combination of hardware and software, the processor 120 may represent an entity (e.g., physically embodied in circuitry—in the form of processing circuitry) capable of performing operations according to some embodiments while configured accordingly. Thus, for example, when the processor 120 is embodied as an ASIC, FPGA, or the like, the processor 120 may have specifically configured hardware for conducting the operations described herein. Alternatively, as another example, when the processor 120 may be embodied as an executor of software instructions, the instructions may specifically configure the processor 120 to perform the operations described herein.

In some embodiments, the processor 120 is coupled to a display device 112. As such, external boundaries and dimensions of the monocrystalline component 102, internal boundaries and dimensions of the monocrystalline component 102, and any internal defects within the monocrystalline component 102 may be displayed in real-time on the display device 112 during the inspection process. In some embodiments, the boundaries, dimensions, and defects are displayed on the display device 112 in real-time three-dimensional (3D) imaging.

For testing the monocrystalline component 102, the system 100 may first need to be instituted or configured to be able to test one monocrystalline component 102 from the population of monocrystalline components 102. The steps involved in instituting the system 100 will be described hereinafter in detail.

Figure 2:
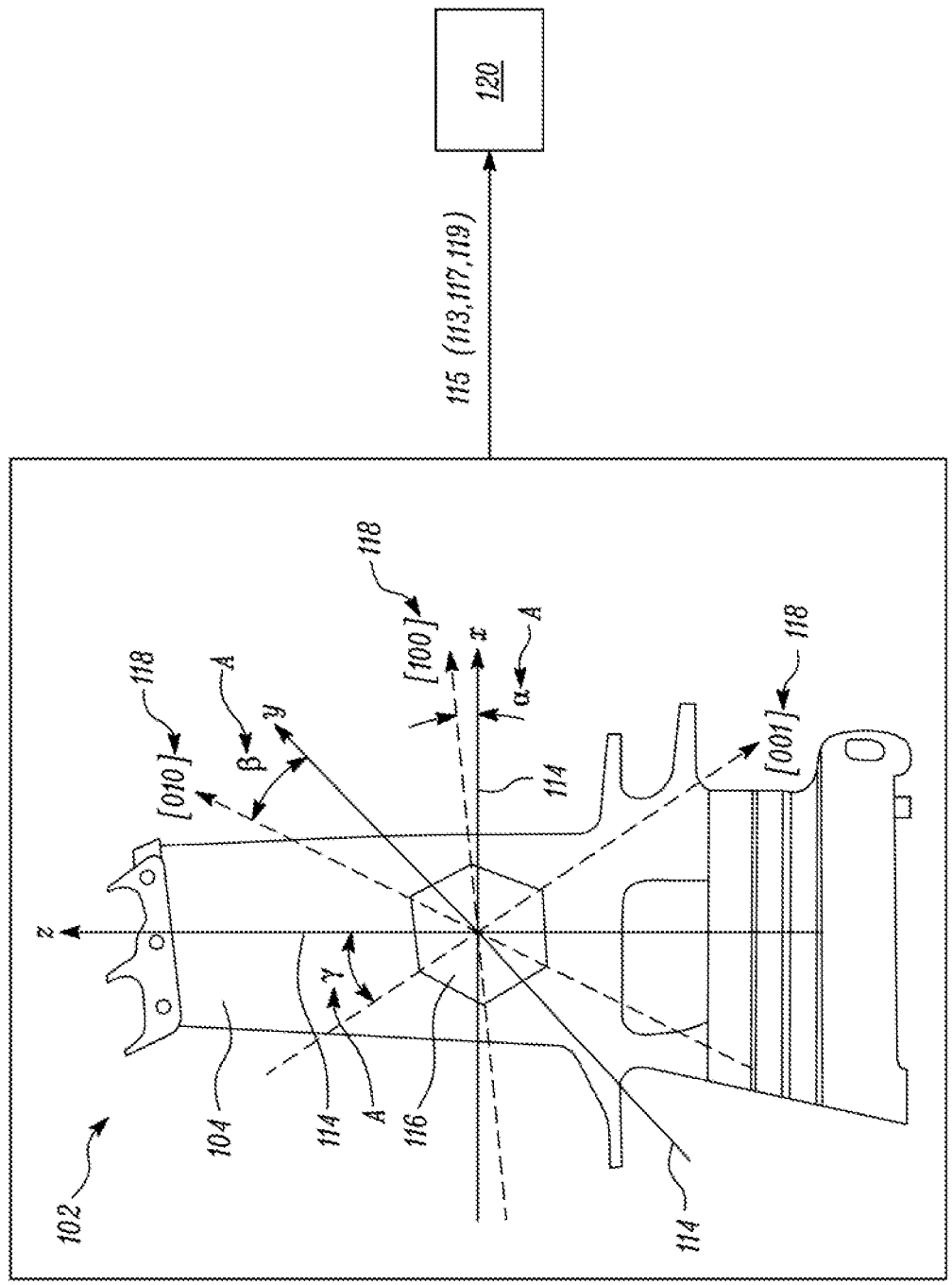
FIG. 2 is a schematic view of an example of the monocrystalline component.

FIG. 2 illustrates a schematic perspective view of an example of the monocrystalline component 102 from the population of monocrystalline components 102. Referring now to FIGS. 1 and 2, the processor 120 is configured to obtain a plurality of component parameters 115 associated with the population of monocrystalline components 102. The component parameters 115 may include attributes of the monocrystalline component 102 based on manufacturing data of the population of monocrystalline components 102.

In some embodiments, the manufacturing data may include, but not limited to, serial number of monocrystalline components 102, manufacturing limits, material, geometry, etc. The manufacturing limits may indicate a maximum and a minimum attribute (e.g., tolerance) of the monocrystalline components 102 in the population of monocrystalline components 102. In some embodiments, the population of monocrystalline components 102 may have a common characteristic such as geometry, material, etc. In some embodiments, the manufacturing data may be obtained from a database of the population of monocrystalline components 102. In some embodiments, the manufacturing data may be obtained electronically through a server using wireless communication or through offline means.

The monocrystalline component 102 defines a coordinate axis 114 common to the population of monocrystalline components 102. In some embodiments, the coordinate axis 114 includes mutually orthogonal x, y, and z-axes. The coordinate axis 114 is also referred to as a primary axis of the monocrystalline component 102. Conventional Miller indices 118 of a cubic system (e.g., body centred cubic or a face centred cubic crystal) are also shown in FIG. 2. A crystal 116 of the monocrystalline component 102 may have an orientation which can be defined using such Miller indices 118. The Miller index 118 is also referred to as a secondary axis of the monocrystalline component 102. Only one crystal 116 is shown for the purpose of illustration, however, the monocrystalline component 102 may include a number of crystals 116.

In some embodiments, the crystals 116 of the monocrystalline component 102 may have same orientation throughout the monocrystalline component 102 due to manufacturing of the monocrystalline component 102 using directional solidification. In the cubic system, specification of orientation in space of any two orthogonal axes, such as [100] and [001], will fully define a crystal orientation 113. The crystal orientation 113 includes at least one crystal angle A relative to the coordinate axis 114. Specifically, the at least one crystal angle A includes the angles $\alpha$, $\beta$ and $\gamma$ made by the three orthogonal axes [100], [010] and [001] with the coordinate axis 114, respectively. The at least one crystal angle A is interchangeably referred to hereinafter as the crystal angle A.

In some embodiments, the monocrystalline component 102 may be elastically anisotropic. Therefore, properties (e.g., mechanical properties) of the monocrystalline component 102 may vary with the orientation of the crystals 116, and thus, it may be advantageous to control the crystal orientation 113 during manufacturing of the monocrystalline component 102. Further, velocity of a sound wave in the monocrystalline component 102 may be dependent on a direction of travel of the sound wave in the monocrystalline component 102. Thus, anisotropy causes propagation of ultrasonic waves in the monocrystalline component 102 dependent on a direction of travel.

The component parameters 115 include at least one of: the crystal orientation 113 of each monocrystalline component 102 from the population of monocrystalline components 102 with respect to the coordinate axis 114 common to the population of monocrystalline components 102; a three-dimensional (3D) geometry 117 common to the population of monocrystalline components 102; and a material 119 common to the population of monocrystalline components 102. The crystal orientation 113 includes the at least one crystal angle A, i.e., the angles $\alpha$, $\beta$ and $\gamma$. In some embodiments, the 3D geometry 117 may include a computer aided design (CAD) model of the monocrystalline component 102. In some embodiments, the crystal angle A obtained from the manufacturing data may be first converted into a different coordinate system before being further processed by the processor 120.

In some embodiments, each monocrystalline component 102 in the population of monocrystalline components 102 may include a serial number or a part number. Serial numbers of the monocrystalline components 102 may be obtained from the manufacturing data. Further, a population size and manufacturing limits may also be determined from the manufacturing data. The population size may represent a number of the monocrystalline components 102 in the population of monocrystalline components 102.

FIGS. 3A-3C illustrate examples of statistical distributions 130, 132, 134 of the at least one crystal angle A, i.e., the angles $\alpha$, $\beta$ and $\gamma$, respectively. Specifically, the statistical distribution 130 is a histogram illustrating relative frequencies of occurrence of different values of the angle $\alpha$ in the population of monocrystalline components 102. Similarly, the statistical distributions 132, 134 are histograms illustrating relative frequencies of occurrence of different values of the angles $\beta$ and $\gamma$ in the population of monocrystalline components 102, respectively.

It should be understood that the statistical distributions 130, 132, 134 as illustrated by way of example only, and any type of statistical distribution may be utilized based on application requirements.

Referring now to FIGS. 1-3C, the processor 120 is further configured to determine a statistical parameter 140, 142, 144 associated with the population of monocrystalline components 102 based on the statistical distribution 130, 132, 134 of the at least one crystal angle A (or the angles $\alpha$, $\beta$, and $\gamma$) across the population of monocrystalline components 102. In some embodiments, the statistical parameters 140, 142, 144 may be calculated based on the statistical distributions 130, 132, 134 of the angles $\alpha$, $\beta$, and $\gamma$, respectively.

In some embodiments, the statistical parameter 140, 142, 144 includes a value 140a, 142a, 144a of the at least one crystal angle A (i.e., the respective angles $\alpha$, $\beta$, and $\gamma$) that appears a maximum number of times in the population of monocrystalline components 102. For example, the value 140a of the statistical parameter 140 may correspond to a value of the angle $\alpha$ having a maximum frequency of occurrence in the population of monocrystalline components 102. Thus, the value 140a may represent a value of the angle $\alpha$ possessed by a majority of the monocrystalline components 102 in the population of monocrystalline components 102. Similarly, the values 142a, 144a may correspond to values of the angles $\beta$ and $\gamma$, respectively, having a maximum frequency of occurrence in the population of monocrystalline components 102. Therefore, each of the values 140a, 142a, 144a may correspond to a mode of the respective statistical distribution 130, 132, 134.

It should be understood that the statistical parameters 140, 142, 144 may be determined through any other statistical analysis as well without limiting the scope of the present disclosure. For example, one or more of the statistical parameters 140, 142, 144 may correspond to a mean or a median of the corresponding statistical distributions 130, 132, 134.

FIGS. 4A and 4B illustrate schematic views of a simulation model 150 of the monocrystalline component 102 according to an embodiment of the present disclosure. Specifically, FIG. 4A illustrates a schematic front view and FIG. 4B illustrates a schematic side view of the monocrystalline component 102, respectively.

Referring now to FIGS. 1-4B, the processor 120 is further configured to generate the simulation model 150 of the monocrystalline component 102 representative of the population of monocrystalline components 102 based at least partially on the statistical parameter 140, 142, 144, the three-dimensional geometry 117, and the material 119. Thus, the simulation model 150 may represent the three-dimensional geometry 117 of the monocrystalline component 102 with the least one crystal angle A (or angles $\alpha$, $\beta$, and $\gamma$) corresponding to the values 140a, 142a, 144a. Also, the simulation model 150 may be obtained considering the most frequently occurring value of the crystal angle A (i.e., the angles $\alpha$, $\beta$, and $\gamma$) of the monocrystalline component 102 in the population of monocrystalline components 102. In some embodiments, the simulation model 150 may be generated by software (e.g., a computer application).

The at least one probe 110 is configured to emit ultrasonic waves 152 towards a predetermined region of interest 124. The predetermined region of interest 124 corresponds to a portion in the three-dimensional geometry 117 of the monocrystalline component 102 where one or more abnormalities 126 is most likely expected to occur. The predetermined region of interest 124 may be obtained based on experimental trials and/or prior knowledge. In some embodiments, the simulation model 150 may allow visualization of a path of the ultrasonic waves 152 in the volume of the monocrystalline component 102. In the illustrated embodiments of FIGS. 4A and 4B, the probe 110 is shown at a distance from the platform 106 of the monocrystalline component 102 for clarity. It is to be noted that the probe 110 and the processor 120 are shown schematically in FIGS. 4A and 4B for the purpose of illustration. Specifically, the probe 110 and the processor 120 are superimposed on the simulation model 150 for descriptive purposes.

In some embodiments, the software may include a database of 3D velocity profiles of different materials. The 3D velocity profiles may be obtained by considering anisotropic properties of the material 119 of the monocrystalline component 102 since properties, such as velocity of sound in the monocrystalline component 102, may vary with a direction of propagation. Thus, the 3D velocity profiles may allow accurate determination and visualization of the path of the ultrasonic waves 152 in the material 119 of the monocrystalline component 102. In some embodiments, the software may consider factors such as phase velocity, energy velocity, wave divergence, wave spreading, and/or wave skewing for determining the path of ultrasonic waves 152 in the monocrystalline component 102.

The processor 120 is further configured to determine at least one probe parameter 122 based at least partially on the simulation model 150 and the predetermined region of interest 124 in the three-dimensional geometry 117. The at least one probe parameter 122 is interchangeably referred to hereinafter as "the probe parameter 122". In the illustrated examples of FIGS. 4A and 4B, the predetermined region of interest 124 is shown as having an oval shape, however, the present disclosure is not limited to any specific shape, and the oval shape of the region of interest 124 is merely used for the purpose of illustration.

In some embodiments, the probe parameter 122 may be determined based on the path of the ultrasonic waves 152 in the monocrystalline component 102. In some embodiments, the probe parameter 122 may include a location of the probe 110 on the monocrystalline component 102 relative to the coordinate axis 114. Thus, the probe parameter 122 may define corresponding X, Y, and Z coordinates of the probe 110 relative to the coordinate axis 114. Additionally, the probe parameter 122 may include an orientation of the probe 110 with respect to the coordinate axis 114. Thus, the probe parameter 122 may define corresponding angles made by the probe 110 with respect to the coordinate axis 114.

In some embodiments, the probe parameter 122 may include a type of wave to be used for inspection, for example, longitudinal waves, shear waves, or a combination thereof. The probe parameter 122 may further include a design and configuration (e.g., 1D, 1.5D, 2D, 2.5D, or 3D ultrasound probe) of the probe 110. The design of the probe 110 may include shape, frequency, dimensions, and number of ultrasonic emitter-receiver elements included in the probe 110.

In some embodiments, the probe parameter 122 may further include a pulse-echo configuration and a pitch-catch configuration. The pulse-echo configuration includes a single ultrasonic probe with the ultrasonic emitter and receiver elements configured in the same ultrasonic probe, while the pitch-catch configuration includes ultrasonic emitter and receiver elements incorporated in separate ultrasonic probes. In some embodiments, the at least one probe 110 may include a plurality of probes 110.

In some embodiments, the probe 110 may include a phased array probe. In some embodiments, the probe 110 may include a number of ultrasonic emitter-receiver elements. In some embodiments, each ultrasonic element has its own electrical connection and is acoustically isolated from the other ultrasonic elements. The ultrasonic elements may emit the ultrasonic waves 152. In some embodiments, the probe 110 may be placed on the monocrystalline component 102 such that the ultrasonic waves 152 are directed radially outward towards the region of interest 124. In an alternative embodiment, the probe 110 may include at least one non-phased array transducer configured to transmit the ultrasonic waves 152 into the monocrystalline component 102 at a plurality of angles. In some embodiments, each ultrasonic element has its own pulser/receiver circuit and produces its own radio-frequency time/amplitude response to scan the region of interest 124.

The processor 120 is further configured to determine anisotropic delay laws 156 (shown in FIG. 4C) based at least partially on the statistical parameter 140, 142, 144 and the least one probe parameter 122. FIG. 4C illustrates an example of the anisotropic delay laws 156. In some embodiments, the anisotropic delay laws 156 may include a set of rules that control a timing of emission of the ultrasonic waves 152 and reception to focus the ultrasonic waves 152 at a given point in the region of interest 124. Referring now to FIGS. 1-4C, the anisotropic delay laws 156 may be determined such that the probe 110 may successively generate the ultrasonic waves 152 with an angular coverage AC. In some embodiments, the anisotropic delay laws 156 are determined through the software considering the 3D velocity profile of the material 119 of the monocrystalline component 102.

In some embodiments, the anisotropic delay laws 156 may include parameters associated with the ultrasonic waves 152 such as a wave angle P, a scan range S, a type of focus, and a type of scan. The wave angle P may be determined with respect to a reference axis A-A' of the probe 110. In some embodiments, the wave angle P may include an initial angle P1, a final angle P2, a step size PS and a number of steps between the initial and final angles P1, P2. Individual responses of each ultrasonic element are added by the processor 120 and a resulting scan is displayed on the display device 112. In some embodiments, the anisotropic delay laws 156 may further be determined in the software based on the region of interest 124, ability of the ultrasonic waves 152 to be reflected from the abnormality 126, a coverage around the region of interest 124, and a false detection of the abnormality 126.

In some embodiments, the simulation model 150 may be verified in experimental trials by validating the probe parameters 122 and the anisotropic delay laws 156 on a sample of the monocrystalline components 102 from the population of monocrystalline components 102 that correspond to values 140a, 142a, 144a of the respective angles $\alpha$, $\beta$, $\gamma$. Further, the probe parameters 122 and the anisotropic delay laws 156 are approved if validated in the experimental trials.

The processor 120 is further configured to control the at least one probe 110 based on the anisotropic delay laws 156 to emit the ultrasonic waves 152 towards the region of interest 124 of at least one monocrystalline component 102 from the population of monocrystalline components 102 in order to test the at least one monocrystalline component 102 for the one or more abnormalities 126. The system 100 may be able to test a majority of monocrystalline components 102 from the population of monocrystalline components 102 since the anisotropic delay laws 156 are determined based on the statistical parameter 140, 142, 144.

As the monocrystalline component 102 is scanned by the probe 110, the processor 120 may record the ultrasonic waves 152 reflected from the monocrystalline component 102 or the one or more abnormalities 126 and the wave angle P at which the reflected ultrasonic waves are received. During the inspection process, the ultrasonic waves 152 from the probe 110 are electronically swept through a range of wave angles P within the angular coverage AC based on the anisotropic delay laws 156. In some embodiments, the probe 110 may be controlled to produce a fan-shaped sweep.

In some embodiments, the display device 112 may display the data recorded for the range of wave angles P as a polar plot, generating a cross-sectional view called a "sector scan" image. The sector scan image includes the reflections received from monocrystalline component 102 and/or the one or more abnormalities 126. An image of the one or more abnormalities 126 will be displayed in the display device 112 if present in the region of interest 124. A position and a depth of the one or more abnormalities 126 may be measured directly from the sector scan image. In some embodiments, the processor 120 may transmit the data to an external device such as, but not limited to, a laptop computer, a personal digital assistant (PDA), a smartphone, a tablet device, a data collector, a server, or a network connection.

Figure 5:
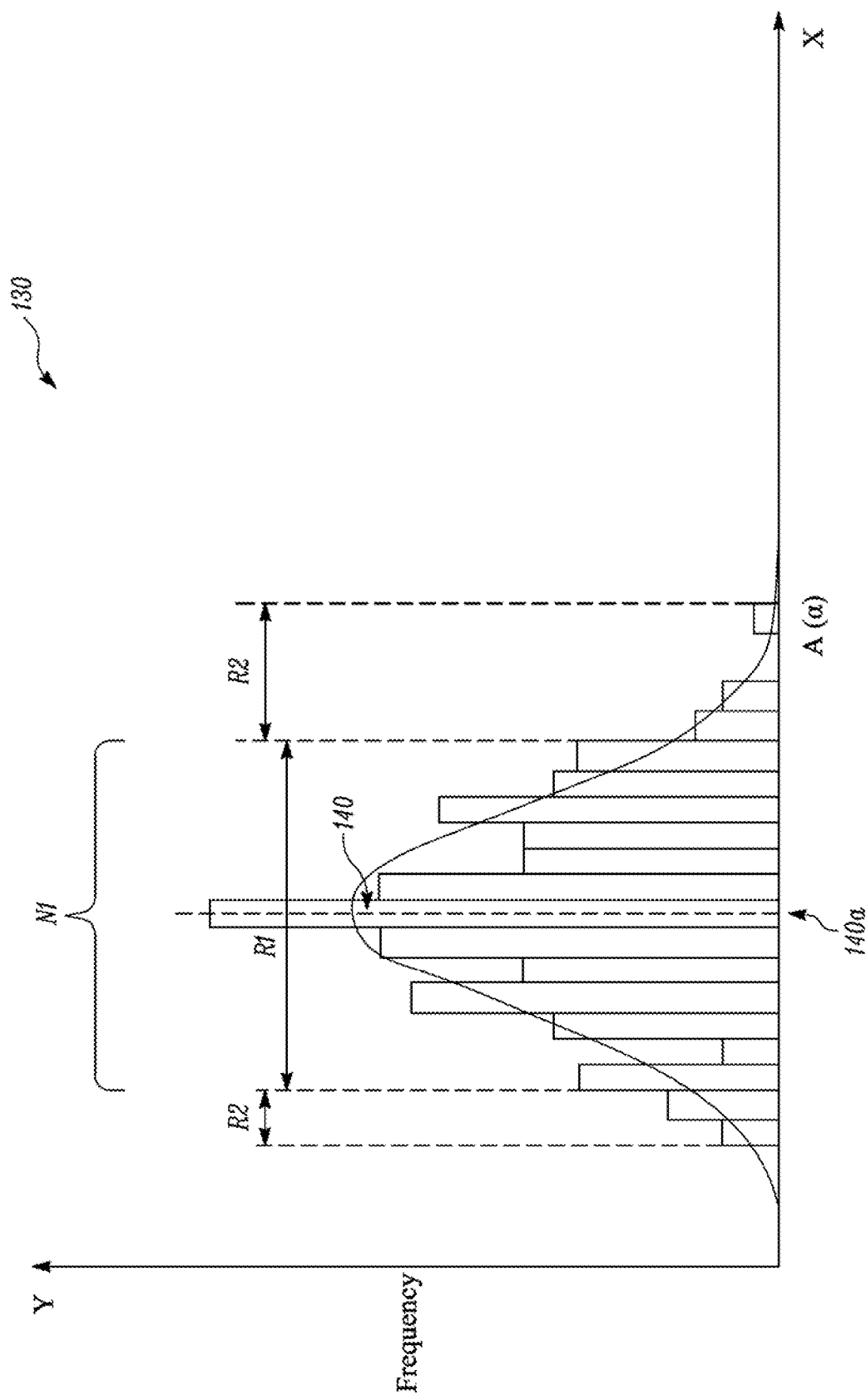
FIG. 5 is an example of the statistical distribution of FIG. 3A.

FIG. 5 illustrates an example of the statistical distribution 130 corresponding to the crystal angle A (e.g., the angle $\alpha$). Referring now to FIGS. 1-5, in some embodiments, the processor 120 is further configured to determine a range R1 of the at least one crystal angle A (e.g., the angle $\alpha$ in FIG. 5) for which the ultrasonic waves 152 emitted by the at least one probe 110 in response to the anisotropic delay laws 156 at least partially overlap the region of interest 124.

In some embodiments, the range R1 may be determined through the software based on the simulation model 150 and the angular coverage AC of the ultrasonic waves 152 corresponding to different values of the angle $\alpha$. In an alternative embodiment, the range R1 may be determined based on an empirical relationship between the angle $\alpha$ and a path of propagation of the ultrasonic waves 152 within the monocrystalline component 102. In some embodiments, the processor 120 is further configured to determine a subset N1 of the monocrystalline components 102 from the population of monocrystalline components 102 having values of the at least one crystal angle A (e.g., the angle $\alpha$ in FIG. 5) that fall within the range R1 of the at least one crystal angle A.

Similarly, a range is also determined corresponding to the angles β and γ. However, the range R1 for the angle α is only shown for the purpose of illustration.

Since the path of propagation of the ultrasonic waves 152 varies with the direction of propagation (and the at least one crystal angle A), there may be some values of the crystal angle A for which the ultrasonic waves 152 emitted by the probe 110 in response to the anisotropic delay laws 156 may not overlap with the region of interest 124. The at least one crystal angle A may vary across the population of monocrystalline components 102, however, the region of interest 124 may remain at the same location. Thus, in some embodiments, the processor 120 is further configured to determine an outlier set of values R2 that lies outside the range R1 of the at least one crystal angle A (e.g., the angle α in FIG. 5) and for which the ultrasonic waves 152 emitted by the probe 110 in response to the anisotropic delay laws 156 may not overlap with the region of interest 124.

In some embodiments, the outlier set of values R2 may be determined based on the simulation model 150 corresponding to the outlier set of values R2 and the probe parameters 122 or the anisotropic delay laws 156 corresponding to the statistical parameter 140, 142, 144. In some embodiments, a degree of overlap may be calculated for the at least one crystal angle A (e.g., the angle α in FIG. 5) based on the ultrasonic waves 152 emitted by the probe 110 in response to the anisotropic delay laws 156 and the simulation model 150 corresponding to the at least one crystal angle A. In some embodiments, the outlier set of values R2 may include all the values of the at least one crystal angle A (e.g., the angle α in FIG. 5) where the degree of overlap is less than a predetermined threshold.

Similarly, an outlier set of values is also determined corresponding to the angles β and γ. However, the outlier set of values R2 corresponding to the angle α is only shown for the purpose of illustration.

Figure 6:
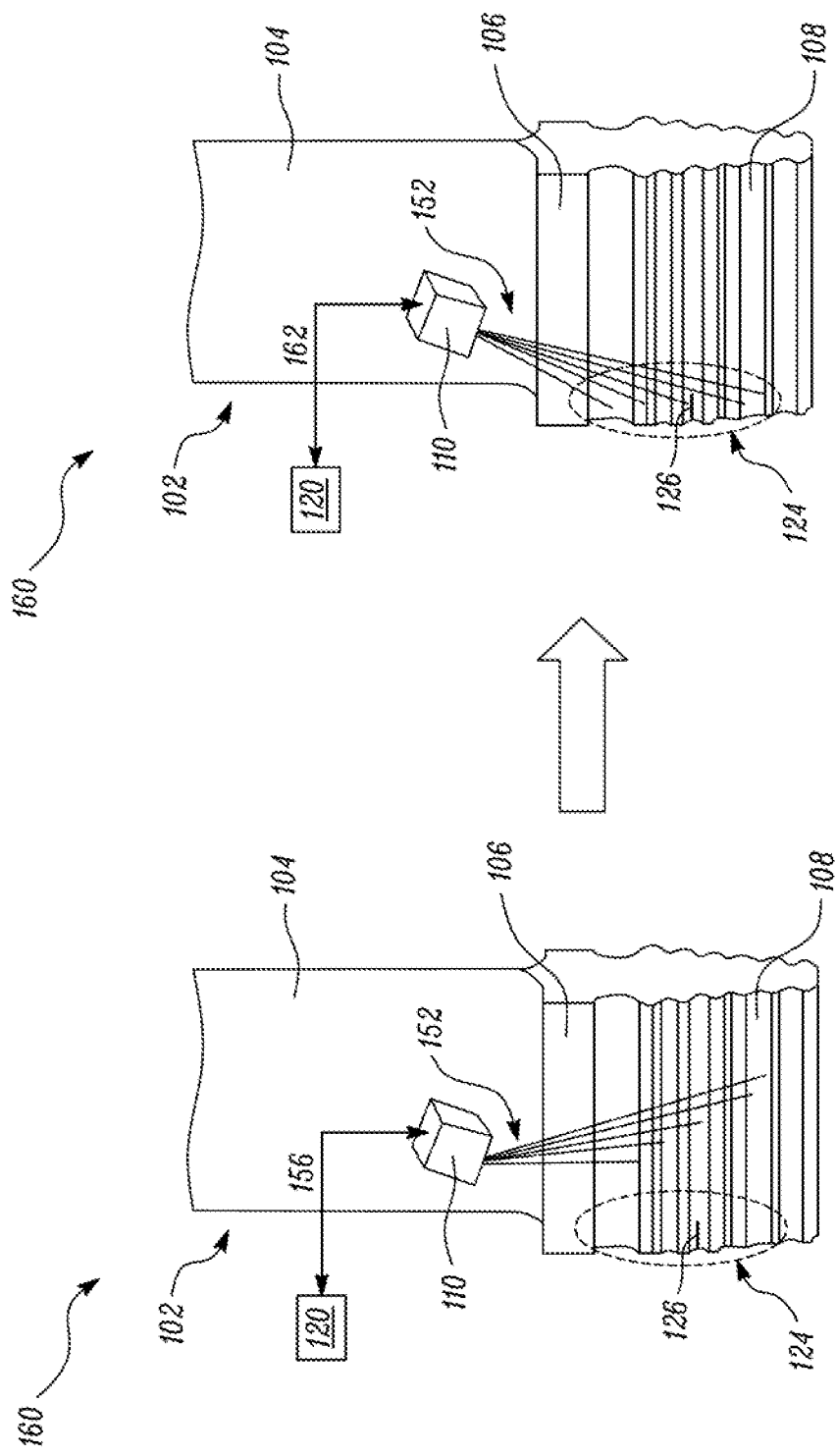
FIG. 6 illustrates the simulation model corresponding to a value of the crystal angle from an outlier set of values and ultrasonic waves emitted by a probe in response to anisotropic delay laws and custom anisotropic delay laws, according to an embodiment of the present disclosure.

In some embodiments, the processor 120 is further configured to determine a set of custom anisotropic delay laws 162 (shown in FIG. 6) such that the ultrasonic waves 152 emitted by the at least one probe 110 in response to the set of custom anisotropic delay laws 162 at least partially overlap the region of interest 124 for the outlier set of values R2 of the at least one crystal angle A (or the angles α, β and γ) that lies outside the range R1 of the at least one crystal angle A. FIG. 6 illustrates an example of the simulation model 160 of the monocrystalline component 102 corresponding to a value of the crystal angle A from the outlier set of values R2 and the ultrasonic waves 152 emitted by the probe 110 in response to the anisotropic delay laws 156 and one of the set of custom anisotropic delay laws 162.

As shown in FIG. 6, the ultrasonic waves 152 do not overlap with the region of interest 124 when the probe 110 is controlled using anisotropic delay laws 156. Consequently, the one or more abnormalities 126 may not be detected. However, the ultrasonic waves 152 at least partially overlap with the region of interest 124 when the probe 110 is controlled using one of the set of custom anisotropic delay laws 162. Consequently, the one or more abnormalities 126 may be detected.

Referring now to FIGS. 1-6, the set of custom anisotropic delay laws 162 may be determined for different values of the at least one crystal angle A (or the angles α, β and γ) from the outlier set of values R2. Specifically, the set of custom anisotropic delay laws 162 may be determined for each individual value of the at least one crystal angle A (or the angles α, β and γ) from the outlier set of values R2 or a range of values of the at least one crystal angle A.

In some embodiments, the set of custom anisotropic delay laws 162 may be determined through the software based on a path of propagation of the ultrasonic waves 152 in the monocrystalline component 102. In some embodiments, the set of custom anisotropic delay laws 162 may be determined based on manual review of the path of propagation of the ultrasonic waves 152 in the software. Alternatively, the set of custom anisotropic delay laws 162 corresponding to the outlier set of values R2 may be determined automatically from the software based on spatial comparison of the ultrasonic waves 152 emitted by the probe 110 in response to different anisotropic delay laws with the region of interest 124.

In some embodiments, the probe parameters 122 may also be modified to allow the ultrasonic waves 152 emitted by the probe 110 to at least partially overlap the region of interest 124 for the outlier set of values R2. For example, a suitable design and configuration (e.g., 1D/1.5D/2D/2.5D phased array probe with different number of ultrasonic elements, dimension, and arrangement) of the probe 110 may be selected to allow the ultrasonic waves 152 emitted by the probe 110 to at least partially overlap the region of interest 124 for the outlier set of values R2. In some examples, the probe parameter 122 may also be interchanged between pulse-echo configuration and pitch-catch configuration.

In some embodiments, the processor 120 is further configured to control the at least one probe 110 based on the anisotropic delay laws 156 and the set of custom anisotropic delay laws 162 in order to test the population of the monocrystalline components 102. In other words, the anisotropic delay laws 156 and the set of custom anisotropic delay laws 162 determined above may be used in the inspection process to test the population of the monocrystalline components 102.

The system 100 allows prior determination of the component parameters 115 associated with the population of monocrystalline components 102 before testing of the monocrystalline components 102. Thus, the system 100 considers variation in the crystal orientation 113 of the monocrystalline components 102 across the population of monocrystalline components 102 during development and realisation of the inspection probe arrangement 101 itself. Further, the simulation models 150, 160 may allow determination of an actual path of the ultrasonic waves 152 in the monocrystalline component 102.

The anisotropic delay laws 156 and the set of custom anisotropic delay laws 162 may consider anisotropic material properties of the monocrystalline component 102 for determining delay laws of the inspection probe arrangement 101. Thus, the ultrasonic waves 152 may be accurately and reliably directed towards the region of interest 124. Further, the anisotropic delay laws 156 and the set of custom anisotropic delay laws 162 may allow the inspection probe arrangement 101 to test the entire population of the monocrystalline components 102. The set of custom anisotropic delay laws 162 may allow the inspection probe arrangement 101 to test the monocrystalline components 102 for which the at least one crystal angle A may lie outside the range R1 of the at least one crystal angle A.

The system 100 may eliminate the need for any post-processing of an output of the inspection probe arrangement 101 since anisotropic material properties are already considered during the development and realisation of the inspection probe arrangement 101. This may allow immediate isolation of the monocrystalline components 102 during testing. Further, the testing of monocrystalline components 102 may be performed quickly and in a reliable manner.

Figure 7:
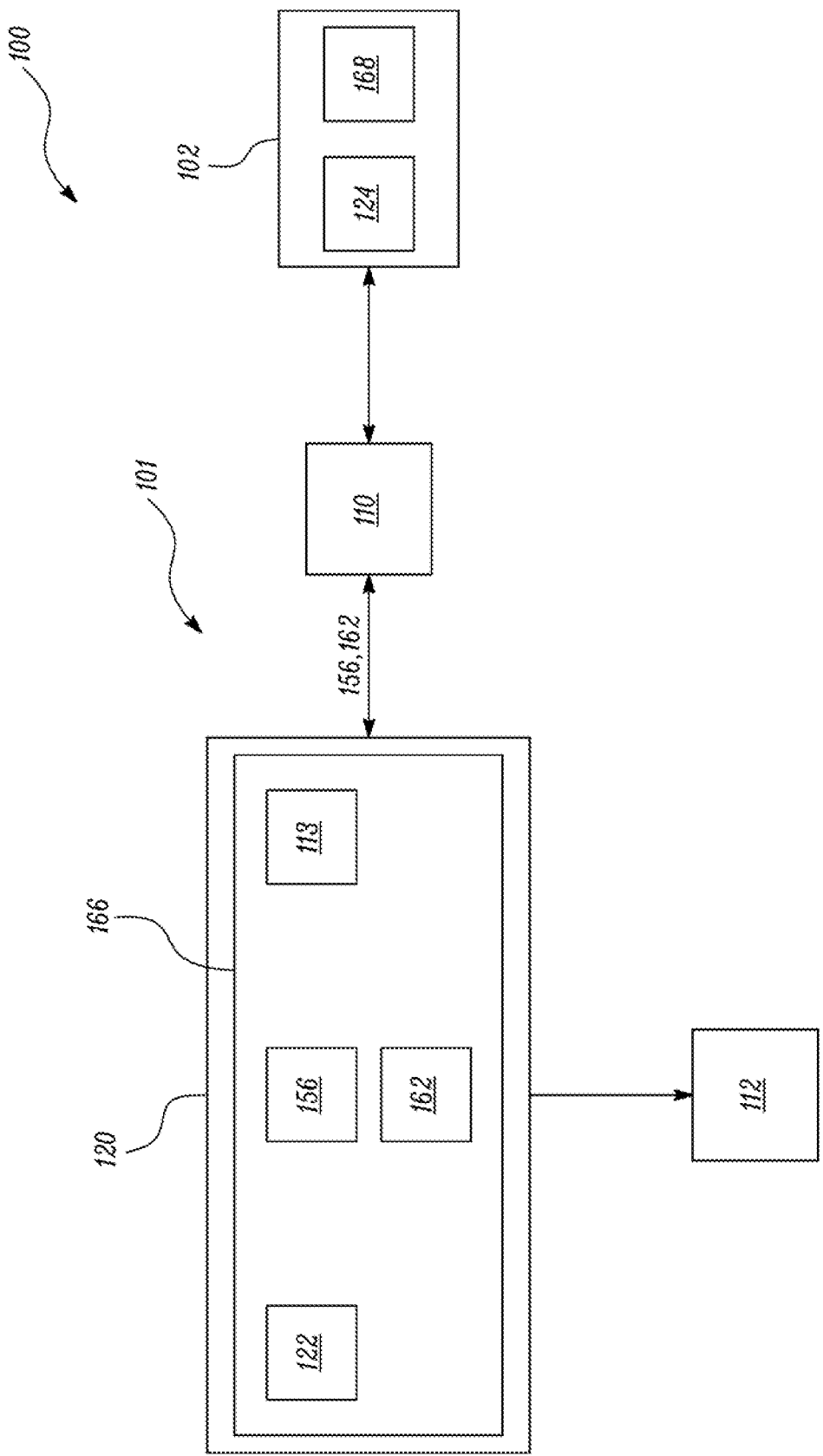
FIG. 7 is a block diagram of the system of FIG. 1, according to another embodiment of the present disclosure.

FIG. 7 illustrates a block diagram of the system 100 according to an embodiment of the present disclosure. In the illustrated embodiment FIG. 7, the processor 120 includes a memory 166 configured to store the crystal orientation 113 (or the at least one crystal angle A) of each monocrystalline component 102 in the population of monocrystalline components 102, the probe parameters 122, the anisotropic delay laws 156, and the set of custom anisotropic delay laws 162. In some embodiments, the memory 166 may also be external to and communicably coupled to the processor 120.

In some examples, the memory 166 may also be configured to store data, such as the manufacturing data of the population of monocrystalline components 102, sector scan images, etc. In some examples, the processor 120 may be configured to execute instructions stored in the memory 166. The functions, acts, or tasks illustrated in the figures or described herein may be performed by the processor 120 by executing the instructions stored in the memory 166.

In some examples, the memory 166 may be a main memory, a static memory, or a dynamic memory. The memory 166 may include, but may not limited to, computer readable storage media, such as various types of volatile and non-volatile storage media, including, but not limited to, random access memory, read-only memory, programmable read-only memory, electrically programmable read-only memory, electrically erasable read-only memory, flash memory, magnetic tape or disk, optical media, and/or the like.

Referring to FIGS. 1 to 7, during testing of the monocrystalline component 102, the probe 110 is configured to emit ultrasonic waves (e.g., the ultrasonic waves 152) towards the region of interest 124 of the monocrystalline component 102 based on inputs from the processor 120. In some embodiments, the processor 120 is configured to determine a crystal orientation 168 of the at least one monocrystalline component 102. The crystal orientation 168 of the at least one monocrystalline component 102 may be determined from the manufacturing data of the population of monocrystalline components 102 (e.g., using a part number or a specification of the gas turbine engine). In some embodiments, the processor 120 may determine the crystal orientation 168 based on manual input of the part number or the specification of gas turbine engine.

The processor 120 is further configured to select the anisotropic delay laws 156 or one of the set of custom anisotropic delay laws 162 based on the crystal orientation 168. Thus, the processor 120 may select the anisotropic delay laws 156 when the crystal orientation 168 is within a range (e.g., the range R1) of the at least one crystal angle A. If the crystal orientation 168 belongs to an outlier set of the values (e.g., the outlier set of values R2), the processor 120 may select one of the set of custom anisotropic delay laws 162 which corresponds to that crystal orientation 168. In some embodiments, the processor 120 is further configured to control the at least one probe 110 based on the selected anisotropic delay laws 156 or the one of the set of custom anisotropic delay laws 162 in order to test the at least one monocrystalline component 102.

Thus, the system 100 may allow selection of the anisotropic delay laws 156 or one of the set of custom anisotropic delay laws 162 as applicable based on the crystal orientation 168 of the at least one monocrystalline component 102 in order to test the at least one monocrystalline component 102.

In some embodiments, the processor 120 is further configured to sequentially control the at least one probe 110 based at least on the anisotropic delay laws 156 and the set of custom anisotropic delays laws 162 to test the at least one monocrystalline component 102 if the crystal orientation (168) of the at least one monocrystalline component 102 is unknown. Thus, the processor 120 may obtain an output (e.g., a set of sectoral scan images) from the at least one probe 110 corresponding to the anisotropic delay laws 156 and the set of custom anisotropic delay laws 162. The output may be displayed through the display device 112 and may be verified manually for presence of one or more abnormalities (e.g., the one or more abnormalities 126). Thus, the system 100 may allow testing of the monocrystalline components 102 even if the crystal orientation (168) of the at least one monocrystalline component 102 is unknown during testing.

Figure 8:
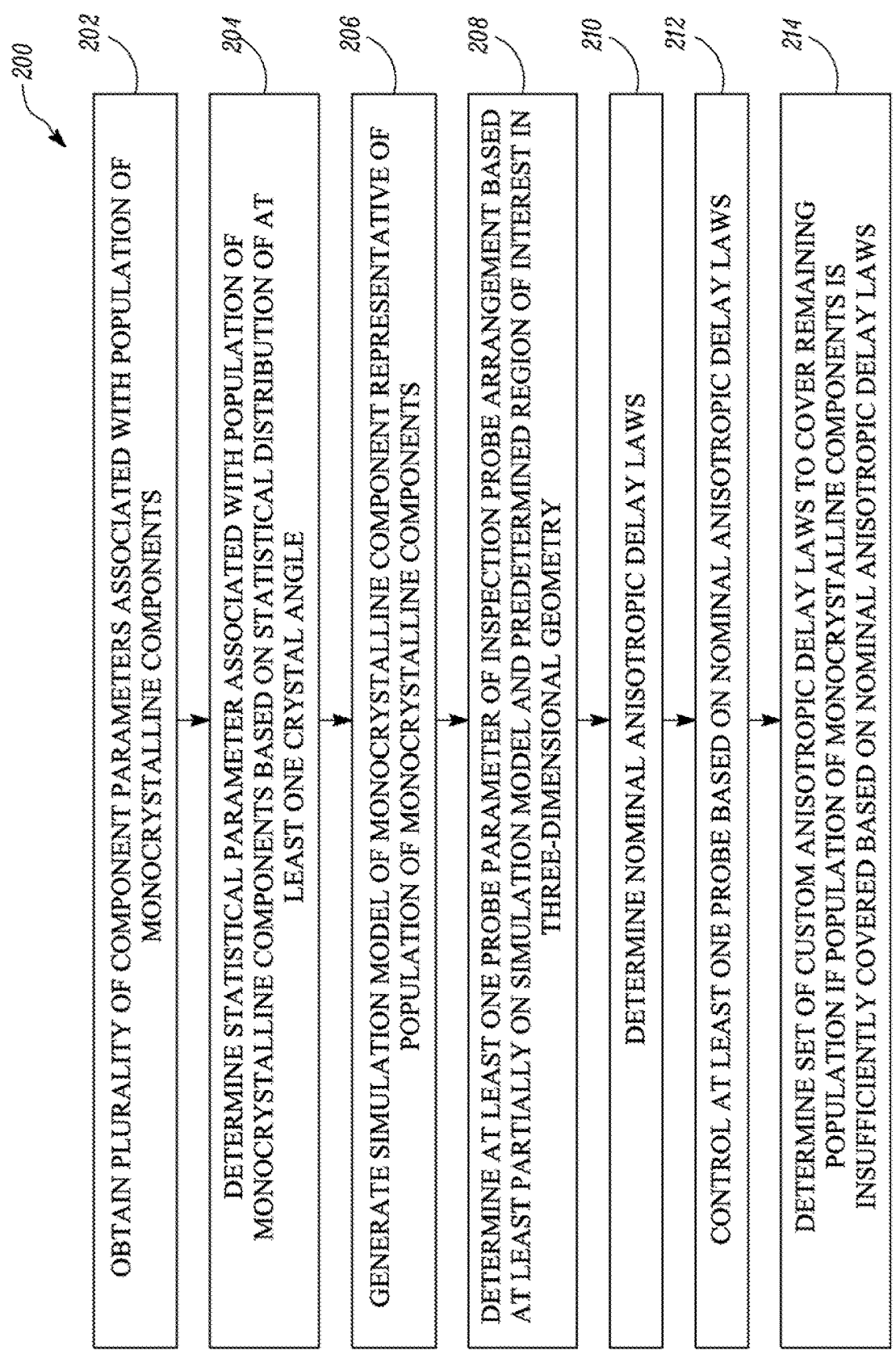
FIG. 8 is a flow chart illustrating a method for testing of the population of monocrystalline components, according to an embodiment of the present disclosure.

FIG. 8 is a flow chart illustrating a method 200 for testing of the population of monocrystalline components 102. The method 200 may be implemented using the system 100 of FIGS. 1-7 incorporating the teachings of the present disclosure.

At step 202, the method 200 includes obtaining the plurality of component parameters 115 associated with the population of monocrystalline components 102. The plurality of component parameters 115 includes at least one of: the crystal orientation 113 of each monocrystalline component 102 from the population of monocrystalline components 102 with respect to the coordinate axis 114 common to the population of monocrystalline components 102; the three-dimensional geometry 117 common to the population of monocrystalline components 102; and the material 119 common to the population of monocrystalline components 102. The crystal orientation 113 includes the at least one crystal angle A relative to the coordinate axis 114.

At step 204, the method 200 further includes determining the statistical parameter 140, 142, 144 associated with the population of monocrystalline components 102 based on the statistical distribution 130, 132, 134 of the at least one crystal angle A across the population of monocrystalline components 102. In some embodiments, the statistical parameter 140, 142, 144 includes the value 140a, 142a, 144a of the at least one crystal angle A that appears a maximum number of times in the population of monocrystalline components 102.

At step 206, the method 200 further includes generating the simulation model 150 of the monocrystalline component 102 representative of the population of monocrystalline components 102 based at least partially on the statistical parameter 140, 142, 144, the three-dimensional geometry 117, and the material 119.

At step 208, the method 200 further includes determining the at least one probe parameter 122 of the inspection probe arrangement 101 based at least partially on the simulation model 150 and the predetermined region of interest 124 in the three-dimensional geometry 117. The inspection probe arrangement 101 includes the at least one probe 110 configured to emit the ultrasonic waves 152.

At step 210, the method 200 further includes determining the anisotropic delay laws 156 based at least partially on the statistical parameter 140, 142, 144 and the least one probe parameter 122. At step 212, the method 200 further includes controlling the at least one probe 110 based on the anisotropic delay laws 156 to emit the ultrasonic waves 152 towards the region of interest 124 of at least one monocrystalline component 102 from the population of monocrystalline components 102 in order to test the at least one monocrystalline component 102 for the one or more abnormalities 126.

In some embodiments, the method 200 further includes determining the range R1 of the at least one crystal angle A for which the ultrasonic waves 152 emitted by the at least one probe 110 in response to the anisotropic delay laws 156 at least partially overlap the region of interest 124. In some embodiments, the method 200 further includes determining the subset N1 of the monocrystalline components 102 from the population of monocrystalline components 102 having values of the at least one crystal angle A that fall within the range R1 of the at least one crystal angle A.

It may be possible that the ultrasonic waves 152 emitted by the at least one probe 110 in response to the anisotropic delay laws 156 may be able to at least partially overlap the region of interest 124 for only a percentage (e.g., 70% or 80%) of the monocrystalline components 102 from the population of monocrystalline components 102. This is applicable for the monocrystalline components 102 for which the at least one crystal angle A lies within the range R1 of the at least one crystal angle A. Thus, for the remaining monocrystalline components 102 (e.g., 20% or 30% of the population of monocrystalline components 102) having the at least one crystal angle A that lies outside the range R1 of the at least one crystal angle A, the ultrasonic waves 152 emitted by the at least one probe 110 in response to the anisotropic delay laws 156 may not be able to overlap the region of interest 124. In this case, the population of monocrystalline components 102 may not be entirely tested based on the anisotropic delay laws 156, and hence, the population of monocrystalline components 102 may be insufficiently covered based on the anisotropic delay laws 156.

The method 200 further includes determining the set of custom anisotropic delay laws 162 if the population of monocrystalline components 102 is insufficiently covered based on the anisotropic delay laws 156. At step 214, the method 200 further includes determining the set of custom anisotropic delay laws 162 such that the ultrasonic waves 152 emitted by the at least one probe 110 in response to the set of custom anisotropic delay laws 162 at least partially overlap the region of interest 124 for the outlier set of values R2 of the at least one crystal angle A that lies outside the range R1 of the at least one crystal angle A. Thus, the method 200 determines the set of custom anisotropic delay laws 162 to cover the remaining population of the monocrystalline components 102 if the population of monocrystalline components 102 is insufficiently covered based on the anisotropic delay laws 156.

In some embodiments, the method 200 further includes controlling the at least one probe 110 based on the anisotropic delay laws 156 and the set of custom anisotropic delay laws 162 in order to test the population of the monocrystalline components 102.

In some embodiments, the method 200 further includes determining a crystal orientation 168 of the at least one monocrystalline component 102. In some embodiments, the method 200 further includes selecting the anisotropic delay laws 156 or one of the set of custom anisotropic delay laws 162 based on the crystal orientation 168. In some embodiments, the method 200 further includes controlling the at least one probe 110 based on the selected anisotropic delay laws 156 or the one of the set of custom anisotropic delay laws 162 in order to test the at least one monocrystalline component 102.

In some embodiments, the method 200 further includes sequentially controlling the at least one probe 110 based at least on the anisotropic delay laws 156 and the set of custom anisotropic delays laws 162 to test the at least one monocrystalline component 102 if the crystal orientation 168 of the at least one monocrystalline component 102 is unknown.

While the system 100 for testing the population of monocrystalline components 102 of the present disclosure has largely been described above with reference to its use in gas turbine engines, however, the system 100 may also be used for many other applications for non-destructive testing of such monocrystalline components 102. Thus, the system 100 may be useful in non-destructive testing of various other components in other application areas.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method for testing of a population of monocrystalline components, the method comprising the steps of:

obtaining a plurality of component parameters associated with the population of monocrystalline components, wherein each monocrystalline component of the population of monocrystalline components comprises at least one of a material having a single crystal or a material having multiple crystals oriented in a same crystal orientation, and wherein the plurality of component parameters comprises:
  a crystal orientation of each monocrystalline component from the population of monocrystalline components with respect to a coordinate axis common to the population of monocrystalline components, a three-dimensional geometry common to the population of monocrystalline components, and a material common to the population of monocrystalline components, wherein the crystal orientation comprises a crystal angle relative to the coordinate axis;

determining a statistical parameter associated with the population of monocrystalline components based on a statistical distribution of the crystal angle across the population of monocrystalline components;

generating a simulation model of the monocrystalline component representative of the population of monocrystalline components based at least partially on the statistical parameter, the three-dimensional geometry, and the material;

determining at least one probe parameter of an inspection probe arrangement based at least partially on the simulation model and a predetermined region of interest in the three-dimensional geometry, wherein the inspection probe arrangement comprises at least one probe configured to emit ultrasonic waves;

determining anisotropic delay laws based at least partially on the statistical parameter and the at least one probe parameter; and controlling the at least one probe based on the anisotropic delay laws to emit the ultrasonic waves towards a predetermined region of interest of at least one monocrystalline component from the population of monocrystalline components corresponding to the predetermined region of interest in the three-dimensional geometry in order to test the at least one monocrystalline component for one or more abnormalities.

2. The method of claim 1, wherein the statistical parameter comprises a value of the crystal angle that appears a maximum number of times in the population of monocrystalline components.

3. The method of claim 1, further comprising:
determining a range of the crystal angle for which the ultrasonic waves emitted by the at least one probe in response to the anisotropic delay laws at least partially overlap the predetermined region of interest in the three-dimensional geometry; and
determining a subset of the monocrystalline components from the population of monocrystalline components having values of the crystal angle that fall within the range of the crystal angle.

4. The method of claim 3, further comprising:
determining a set of custom anisotropic delay laws such that the ultrasonic waves emitted by the at least one probe in response to the set of custom anisotropic delay laws at least partially overlap the predetermined region of interest in the three-dimensional geometry for an outlier set of values of the crystal angle that lies outside the range of the crystal angle.

5. The method of claim 4, further comprising:
controlling the at least one probe based on the anisotropic delay laws and the set of custom anisotropic delay laws in order to test the population of the monocrystalline components.

6. The method of claim 4, further comprising:
determining a crystal orientation of the at least one monocrystalline component;
selecting the anisotropic delay laws or one of the set of custom anisotropic delay laws based on the crystal orientation; and
controlling the at least one probe based on the selected anisotropic delay laws or the one of the set of custom anisotropic delay laws in order to test the at least one monocrystalline component.

7. The method of claim 4, further comprising:
sequentially controlling the at least one probe based at least on the anisotropic delay laws and the set of custom anisotropic delays laws in order to test the at least one monocrystalline component if a crystal orientation of the at least one monocrystalline component is unknown.

8. The method of claim 1, wherein the at least one probe is at least one phased array probe.

9. A system for testing a population of monocrystalline components, the system comprising:
at least one probe configured to emit ultrasonic waves towards a predetermined region of interest of at least one monocrystalline component from the population of monocrystalline components, wherein each monocrystalline component of the population of monocrystalline components comprises at least one of a material having a single crystal or a material having multiple crystals oriented in a same crystal orientation; and
a processor communicably coupled to the at least one probe and configured to:
obtain a plurality of component parameters associated with the population of monocrystalline components, wherein the plurality of component parameters comprises a crystal orientation of each monocrystalline component from the population of monocrystalline components with respect to a coordinate axis common to the population of monocrystalline components, a three-dimensional geometry common to the population of monocrystalline components, and a material common to the population of monocrystalline components, wherein the crystal orientation comprises a crystal angle relative to the coordinate axis;
determine a statistical parameter associated with the population of monocrystalline components based on a statistical distribution of the crystal angle across the population of monocrystalline components;
generate a simulation model of the monocrystalline component representative of the population of monocrystalline components based at least partially on the statistical parameter, the three-dimensional geometry, and the material;
determine at least one probe parameter based at least partially on the simulation model and a predetermined region of interest in the three-dimensional geometry, wherein the predetermined region of interest in the three-dimensional geometry corresponds to predetermined region of interest of the at least one monocrystalline component;
determine anisotropic delay laws based at least partially on the statistical parameter and the at least one probe parameter; and
control the at least one probe based on the anisotropic delay laws to emit the ultrasonic waves towards the predetermined region of interest of the at least one monocrystalline component from the population of monocrystalline components in order to test the at least one monocrystalline component for one or more abnormalities.

10. The system of claim 9, wherein the statistical parameter comprises a value of the crystal angle that appears a maximum number of times in the population of monocrystalline components.

11. The system of claim 9, wherein the processor is further configured to:
determine a range of the crystal angle for which the ultrasonic waves emitted by the at least one probe in response to the anisotropic delay laws at least partially overlap the predetermined region of interest; and
determine a subset of the monocrystalline components from the population of monocrystalline components having values of the crystal angle that fall within the range of the crystal angle.

12. The system of claim 11, wherein the processor is further configured to determine a set of custom anisotropic delay laws such that the ultrasonic waves emitted by the at least one probe in response to the set of custom anisotropic delay laws at least partially overlap the predetermined region of interest for an outlier set of values of the crystal angle that lies outside the range of the crystal angle.

13. The system of claim 12, wherein the processor is further configured to control the at least one probe based on the anisotropic delay laws and the set of custom anisotropic delay laws in order to test the population of the monocrystalline components.

14. The system of claim 12, wherein the processor is further configured to:
determine a crystal orientation of the at least one monocrystalline component;
select the anisotropic delay laws or one of the set of custom anisotropic delay laws based on the crystal orientation; and
control the at least one probe based on the selected anisotropic delay laws or the one of the set of custom anisotropic delay laws in order to test the at least one monocrystalline component.

15. The system of claim 12, wherein the processor is further configured to sequentially control the at least one probe based at least on the anisotropic delay laws and the set of custom anisotropic delays laws to test the at least one monocrystalline component if a crystal orientation of the at least one monocrystalline component is unknown.

16. The system of claim 9, wherein the at least one probe comprises a plurality of probes.

17. The system of claim 9, wherein the at least one probe is at least one phased array probe.

* * * * *